United States Patent [19]
Baker et al.

[11] Patent Number: 5,409,527
[45] Date of Patent: Apr. 25, 1995

[54] WATER-BASED WATER REPELLENTS

[75] Inventors: Gary Baker, Manchester; John W. Prince, Rochdale, both of United Kingdom

[73] Assignee: Manchem Limited, Manchester, United Kingdom

[21] Appl. No.: 158,814

[22] PCT Filed: Sep. 11, 1990

[86] PCT No.: PCT/GB90/01404
  § 371 Date: May 11, 1992
  § 102(e) Date: May 11, 1992

[87] PCT Pub. No.: WO91/04305
  PCT Pub. Date: Apr. 4, 1991

Related U.S. Application Data

[63] Continuation of Ser. No. 838,819, May 11, 1992, abandoned.

[30] Foreign Application Priority Data

Sep. 16, 1989 [GB] United Kingdom ............... 8921041

[51] Int. Cl.$^6$ ................................................ C09K 3/18
[52] U.S. Cl. .................................. 106/2; 106/287.19; 106/287.25; 106/271; 427/391; 427/395; 427/394; 427/396; 427/397
[58] Field of Search ............... 106/2, 287.19, 287.25, 106/20 R, 271; 427/384, 394, 395, 396, 397

[56] References Cited

U.S. PATENT DOCUMENTS

| | | | |
|---|---|---|---|
| 2,737,458 | 3/1956 | Burnham | 106/2 |
| 3,374,100 | 3/1968 | Goldstein et al. | 106/2 |
| 3,660,303 | 5/1972 | Hiestand | 106/2 |
| 3,901,727 | 8/1975 | Loudas | 106/2 |
| 3,912,674 | 10/1975 | Stahl | 260/23 AR |
| 4,360,385 | 11/1982 | Grunewalder | 106/2 |

FOREIGN PATENT DOCUMENTS

| | | |
|---|---|---|
| 0216297 | 4/1987 | European Pat. Off. |
| 0257720 | 3/1988 | European Pat. Off. |
| 0070983A1 | 5/1982 | Germany |
| 3215936A1 | 11/1983 | Germany |
| 1002103 | 8/1965 | United Kingdom |
| 2168394 | 6/1986 | United Kingdom |

*Primary Examiner*—Mark L. Bell
*Assistant Examiner*—C. M. Bonnir
*Attorney, Agent, or Firm*—Finnegan, Henderson, Farabow, Garrett & Dunner

[57] ABSTRACT

An aqueous water repellent composition comprising the reaction product of one or more of a carboxylic acid or anhydride containing from 3 to 22 carbon atoms and a polyfunctional aromatic or aliphatic amine or substituted amine containing from 2 to 25 carbon atoms and a water soluble metal complex crosslinking agent containing one or more metals selected from Groups Ia, IIa, IIIa, IVa and the first and second rows of transition metals from the Periodic Table of Elements. The composition may contain wax and is dispersed in water to form a water repellent system.

21 Claims, No Drawings

WATER-BASED WATER REPELLENTS

This application is a continuation of application Ser. No. 07/838,819, filed May 11, 1992, now abandoned.

This invention relates to aqueous, air drying, water repellent compositions that provide improved long-term water repellency to substrates such as wood and other cellulosic materials, textiles, masonry and concrete. The compositions are also useful in imparting hydrophobicity to powders, for example calcium carbonate, as well as printing inks, adhesives, leather and water-based surface coatings.

Many organic solvent-based coating compositions have been developed which show good water repellency but the use of organic solvents is now a cause for concern on environmental and health grounds. A water repellent system dispersible in water, thus reducing the volatile organic content to a minimum without affecting water repellency properties, is highly desirable.

Aqueous water repellent systems, ie. systems which are dispersible in water, have been developed previously. GB2168394 describes water dispersible compositions useful for preparing aqueous water repellent systems comprising a saturated hydrocarbon wax, at least one oil-soluble metal salt of an organic carboxylic acid, at least one sufactant and at least one hydrocarbon solvent.

The compositions can be mixed or diluted with water to form the desired aqueous water repellent systems.

According to the present invention there is provided an aqueous water repellent composition comprising the reaction product of (i) one or more carboxylic acids or anhydrides containing from 3 to 22 carbon atoms, (ii) one or more polyfunctional aromatic or aliphatic amines or substituted amines containing from 2 to 25 carbon atoms, and (iii) a water soluble metal complex crosslinking agent containing one or more metals selected from zinc, aluminium, titanium, copper, chromium, iron, zirconium and lead.

In particular embodiments of the invention the presence of aqueous acrylic polymers contributes to the stability of the complex compositions as well as giving improved water repellency by additional crosslinking, and possibly a degree of film formation when larger amounts are used.

In a preferred embodiment of the invention, a saturated hydrocarbon wax and/or alkyd resin may be incorporated into the water repellent systems to improve water repellent properties.

In further embodiments of the invention, small amounts of solubilising agents such as sodium hydroxide or ammonia may be added to improve stability.

The compositions broadly described above are useful in that they can be mixed with water to form water repellent systems stable for long periods when mixed, and find application in imparting water repellency to many materials including, wood, paper, and other cellulosic materials, textiles, masonry, cement, surface coatings, powders, inks, leather and adhesives.

In a typical treatment for imparting water repellency to a wood substrate, it is believed that on contact with the wood a reaction takes place which enables the carboxylic acid and/or amine compound to crosslink with the reactive metal of the metal organic compound to form a water repellent substrate under ambient conditions. Wax, if present as a constituent, adds to the substantivity of the repellency.

A particular advantage of the water repellent systems of the present invention is that the use of undesirable hydrocarbon or other organic solvents is unnecessary to maintain the water repellents in solution. The water repellents of the invention are dispersed in a wholly aqueous medium for use in the treatment of the various substrates. The weight of solids in the solution is preferably in the range from 1% to 10%.

In preferred aspects of the invention, the carboxylic acid used is a saturated or unsaturated fatty acid exemplified by oleic, isostearic, stearic and ricinoleic acids. Thus an amine soap of isostearic acid was prepared by adding molten isostearic acid at 70°-80° C. to an agitated solution of triethanolamine in water. The mixture was agitated for 15 minutes, allowed to cool below 50° C. and a zirconiummetal crosslinking agent was added to form an example of a water repellent composition according to the invention.

Preferred crosslinking agents may be selected from metal salts of the group comprising zinc, aluminium, titanium, copper, chromium, iron, zirconium and lead and may be exemplified by zirconium complexes as described for example in GB1002103 and, according to one process, prepared by refluxing a carboxylic acid containing 1–4 carbon atoms with a zirconyl carbonate paste and then adding a carboxylic acid containing more that 4 carbon atoms.

Water soluble inorganic metal compounds may also be used. Ammonium zirconium carbonate is particularly preferred for preparing compositions according to the invention.

The broad description above for the manufacture of a typical water repellent complex according to the invention disclosed the use of triethanolamine. Other polyfunctional aromatic or aliphatic amines or substituted amines which are preferred are also water soluble so as to produce a water dispersable compound when reacted with a carboxylic acid, which may also contain a wax, oil, resin or a mixture thereof. All the amines may be substituted optionally with hydroxyl groups, for example, substituted diols and triols, and may be selected from primary, secondary and tertiary amines containing alkyl groups having 1 to 5 carbon atoms or hydrogen, typified by amino methyl propanol, amino methyl propane diol, diamines typified by hydrazine and hexamethylene diamine; cyclic amines; aromatic and aliphatic amino acids typified by 3-methyl-4-amino benzoic acid.

As a feature of the invention, a hydrocarbon wax may be incorporated as an emulsion or dispersion. Preferred waxes are paraffin waxes having melting points in the range of about 50° C.–70° C. These are incorporated by stirring at elevated temperatures in excess of the melting point of the wax. The amount of paraffin wax is preferably 0.0% to 50% by weight of solids.

In previous disclosures waxes have been incorporated into water repellent compositions in organic solvents. In practising the present invention, amounts of paraffin wax representing from 25%–150% weight/weight of the other ingredients present have been successfully incorporated without the need for an organic solvent to aid solution of the wax.

In another aspect, incorporation of an aqueous acrylic polymer such as Glascol LS12, a product available from Allied Colloids, can show improved water repellency as well as improvements in the general stability of the compositions.

Thus, a product according to the invention resulting from the addition of 10% Glascol LS12 to a 1% aqueous solution of the stearate derived from 2-amino-2-methyl-propan-1-ol (AMP) plus 1% Zircomplex PN (a water soluble zirconium lactate acetate complex described in GB1002103) is a low viscosity, milky white liquid with a slight ammoniacal odour. This product shows good water repellent properties when compared with proprietary organic solvent borne water repellents and advantageously has a solids content at least 27% lower than the proprietary products.

The invention will be further apparent from the following examples.

In each example, a carboxylic acid and an alkanolamine were charged at an equimolar ratio, together or separately with water as required by the formulation, to a suitable reaction vessel. Paraffin wax was then added if required by the product formulation and the mixture heated to 70°–75° C. with gentle stirring. At 70°–75° C. the stirring rate was increased to 2,000 rpm and these conditions were maintained for 15 minutes. The reactor contents were then cooled rapidly to below 30° C. whilst maintaining a stirring rate of 2,000 rpm. The stirring was then reduced prior to the addition of a metal crosslinker. The crosslinker addition is made in terms of molar ratios of metal to alkanolamine carboxylate, the ratio being determined by the formulation.

The resultant products are stable for storage and suitable for direct application to a substrate.

The following table gives details of the formulations of the different examples:

| Example | Alkanolamine | Carboxylic Acid | Ammonium Zirconium Carbonate | Wax Content as % of Actual Solids | % Total Solids of Application Solution |
|---------|--------------|-----------------|------------------------------|-----------------------------------|----------------------------------------|
| I | 2-amino-2 methyl propan-1-ol (1.2 moles) | Stearic acid (1.2 moles) | 1.0 mole of zirconium | 50.0% | 2% |
| II | 2-amino-2 methyl propan-1-ol (1.2 moles) | Stearic acid (1.2 moles) | 1.0 mole of zirconium | 41.2% | 1.7% |
| III | 2-amino-2 methyl propan-1-ol (1.2 moles) | Stearic acid (1.2 moles) | 1.0 mole of zirconium | 37.5% | 1.6% |
| IV | 2-amino-2 methyl propan-1-ol (1.2 moles) | Stearic acid (1.2 moles) | 1.0 mole of zirconium | 33.3% | 1.5% |
| V | 2-amino-2 methyl propan-1-ol (1.2 moles) | Stearic acid (1.2 moles) | 1.0 mole of zirconium | 28.6% | 1.4% |
| VI | 2-amino-2 methyl propan-1-ol (1.2 moles) | Stearic acid (1.2 moles) | 1.0 mole of zirconium | 23.1% | 1.3% |
| VII | 2-amino-2 methyl propan-1-ol (1.2 moles) | Stearic acid (1.2 moles) | 1.0 mole of zirconium | 0.0% | 1.0% |
| VIII | 2-amino-2 ethyl propane 1,3 diol (1.0 moles) | Stearic acid (1.0 moles) | 1.0 mole of zirconium | 33.3% | 1.5% |
| IX | 2-amino-2 ethyl propane 1,3 diol (1.0 moles) | Tall oil fatty acid (1.0 mole) | 1.0 mole of zirconium | 50% | 10% |
| X | 2-amino-2 ethyl propane 1,3 diol (1.0 moles) | Tall oil fatty acid (1.0 mole) | 1.0 mole of zirconium | 0.0% | 5% |
| XI | 3 amino 1,2 propane diol (1.2 moles) | Stearic acid (1.2 moles) | 1.0 mole of zirconium | 33.3% | 1.5% |

Examples I–VII are particularly suitable for the treatment of wood.

To test water repellency a swelling test was adopted using 18 mm cubes of softwood as follows:

Each cube treated with water repellent by soaking for 15 minutes in the test solution and air drying for 7–10 days, was placed in a dish beneath a standardised dial gauge. The dial gauge was set to zero and water was added to the dish to totally immerse the test cube.

Dial gauge readings were made at 30 and 120 minute intervals for comparison against a standard. The cube was reweighed to assess the degree of water absorption.

Tests carried out using the products of Examples I–VII gave results as shown in Tables 1 and 2 below:

TABLE 1

| EXAMPLE | Number of tests conducted | % swell after 30 mins submersion based on original cube size | % swell after 120 mins submersion based on original cube size | % water uptake after 120 mins submersion based on original cube weight |
|---------|---------------------------|--------------------------------------------------------------|---------------------------------------------------------------|------------------------------------------------------------------------|
| I | 5 | 0.7 | 1.54 | 11.4 |
| II | 9 | 0.674 | 1.6 | 9.97 |
| III | 1 | 0.575 | 1.615 | 9.5 |
| IV | 13 | 0.48 | 1.58 | 9.25 |
| V | 1 | 0.536 | 1.64 | 9.3 |
| VI | 4 | 0.46 | 1.31 | 12.46 |
| VII | 8 | 0.69 | 1.85 | 18.2 |
| Comparative* | 11 | 0.56 | 1.56 | 10.47 |

TABLE 1-continued

| EXAMPLE | Number of tests conducted | % swell after 30 mins submersion based on original cube size | % swell after 120 mins submersion based on original cube size | % water uptake after 120 mins submersion based on original cube weight |
| --- | --- | --- | --- | --- |
| Water | 6 | 0.71 | 2.32 | 22.9 |

*Thompsons Waterseal (Registered Trade Mark)

TABLE 2

| EXAMPLE | Number of tests conducted | % reduction in the swell recorded after 30 mins submersion | % reduction in the swell recorded after 120 mins submersion | % reduction in the water uptake of the treated cube after 120 mins submersion |
| --- | --- | --- | --- | --- |
| I | 5 | −1.4 | −33.6 | −50.2 |
| II | 9 | −5.1 | −31.0 | −56.5 |
| III | 1 | −19.0 | −30.4 | −58.5 |
| IV | 13 | −32.4 | −31.9 | −59.6 |
| V | 1 | −24.5 | −29.3 | −59.4 |
| VI | 4 | −35.2 | −43.5 | −45.6 |
| VII | 8 | −2.8 | −20.3 | −20.5 |
| Comparative* | 11 | −21.1 | −32.8 | −54.3 |
| Water | 6 | 0 | 0 | 0 |

*Thompsons Waterseal (Registered Trade Mark)

The formulation of Example VIII is particularly suitable for the treatment of textiles.

To test water repellency, samples of cotton fabric (1×0.5 m) were immersed in either the formulation (test) or water (control) for 5 minutes and oven dried at 80° C. for 10 minutes. Spray rating tests were carried out to British Standard 3702. A spray rating of less than 4 fails. Maximum possible rating is 5.

| | Spray Rating |
| --- | --- |
| Test | 5 |
| Control | 2 |

Example VIII is also suitable for the treatment of adhesives.

To test water repellency, an adhesive (polyvinyl acetate), was mixed with either the formulation (test) or water (control) in a 1:1 ratio and Whatman No 1 filter paper discs soaked and oven dried for 15 minutes at 95° C. Hydrostatic head tests (HHT) were then carried out.

| | HHT (cm) |
| --- | --- |
| Test | 34 |
| Control | 16 |

The formulation of Example IX is particularly suitable for the treatment of brick, concrete, ink, leather and chipboard.

To test water repellency of brick and concrete, suitably sized test pieces were soaked in the formulation (test) or water (control) and allowed to dry for 7 days and accurately weighed. The pieces were then immersed in water for 1 hour, dabbed dry and re-weighed.

| | | % wt increase | % reduction in absorbance |
| --- | --- | --- | --- |
| Brick | Test | 1.6 | 83.5 |
| | Control | 9.7 | |
| Pre-cured | Test | 0.5 | 93.2 |
| Concrete | Control | 7.3 | |

To test water repellency of ink, solutions were made up mixing Quink black ink with either the formulation (test) or water (control) in a 1:1 ratio. Whatman No 1 filter paper discs were soaked in the solutions and air dried for 48 hours. Hydrostatic head tests were then carried out.

| | HHT (cm) |
| --- | --- |
| Test | 24.5 |
| Control | 1.0 |

To test water repellency of leather, small pieces (2×3 cm) were soaked in either the formulation (test) or water (control) for 5 minutes and allowed to dry for 5 days before accurately weighing. the pieces were then submerged in water for 1 hour, dabbed dry and re-weighed.

| | % water absorbed | % reduction of control |
| --- | --- | --- |
| Test | 90.4 | 23.8 |
| Control | 118.6 | |

To test water repellency of chipboard, samples (5×5×1.1 cm) were soaked in either the formulation (test) or water (control) for 15 minutes and dried for 72 hours before accurately weighing. Samples were then submerged in water for 24 hours and the percentage swell and water absorption were determined.

| | % swell after submersion | % water absorption based on original wood weight |
| --- | --- | --- |
| Test | 15.0 | 47.4 |
| Control | 27.1 | 62.3 |

The formulation of Example X is particularly suitable for the treatment of powders.

To test water repellency, 10 g of calcium carbonate, either pre-treated with the formulation (test) or untreated (control), was added to 200 ml of water and agitated vigorously for 30 seconds causing the calcium carbonate to 'wet out' and sink to the bottom. The water containing the 'wet' calcium carbonate was then filtered through pre-weighed filter paper, dried at 35C for 48 hours and re-weighed.

|         | wt wetted | % not wetted |
|---------|-----------|--------------|
| Test    | 0.1       | 99           |
| Control | 9.7       | 3            |

The formulation of Example XI is particularly suitable for the treatment of paper to give both water repellency and enhanced tensile strength.

To test water repellency, Whatman No 1 filter paper discs were soaked in either the formulation (test) or water (control), oven dried at 110° C. for 30 minutes before hydrostatic head tests were carried out.

|         | HHT (cm) |
|---------|----------|
| Test    | 100      |
| Control | 15       |

To test wet tensile strength a 555 g weight was used to apply stress to the filter paper discs (5.5 cm Dia) and the time taken for the paper discs to fracture recorded.

|         | Average time to shear (min/sec) |
|---------|--------------------------------|
| Test    | 4–59                           |
| Control | 0                              |

It will be appreciated that it is not intended to limit the invention to the above examples only, many variations, such as might readily occur to one skilled in the art, being possible, without departing from the scope thereof as defined by the appended claims.

We claim:

1. An aqueous composition which is water repellant when dried consisting essentially of a product which is formed by reacting in the presence of water (i) one or more carboxylic fatty acids and (ii) one or more polyfunctional aromatic or aliphatic amines; and subsequently reacting the intermediate product formed thereby with (iii) a water soluble metal complex cross-linking agent.

2. A composition according to claim 1, including a saturated hydrocarbon wax.

3. A composition according to claim 1, including an alkyd resin.

4. A composition according to claim 1, including an aqueous acrylic polymer.

5. A composition according to claim 1, wherein the crosslinking agent comprises Ammonium Zirconium Carbonate.

6. A composition according to claim 1, wherein the carboxylic acid is selected from oleic acid, isostearic acid, stearic acid, ricinoleic acid and tall oil fatty acids.

7. A composition according to claim 1, wherein the polyfunctional amine is a hydroxy-substituted amine and is selected from 2-amino-2-methylpropan-1-ol, 2-amino-2-ethylpropane-1,3-diol, 3-aminopropane-1,2-diol, and triethanolamine.

8. A composition according to claim 1, wherein the weight of solids in the composition is in the range of from about 1%–10%.

9. A composition according to claim 2 wherein paraffin wax is present in an amount from 0.0%–50% by weight of solids.

10. An aqueous composition which is water-repellent when dried comprising the product of mixing in the presence of water at substantially equimolar ratio (i) one or more carboxylic fatty acids of 3 to 22 carbon atoms and (ii) one or more hydroxy-substituted amines containing from 2 to 25 carbon atoms to form an alkanolamine carboxylate, and then adding (iii) a water-soluble zirconium cross-linking agent.

11. A composition according to claim 10, wherein the molar ratio of zirconium to alkanolamine carboxylate is from 1:1.2 to 1:1.

12. A method of treating a substrate to render it water repellent comprising the steps of applying to said substrate the composition as claimed in claim 1 and drying the composition.

13. A method according to claim 12, in which the substrate is brick masonry or concrete.

14. A method according to claim 12, in which the substrate is wood.

15. A method according to claim 12, in which the substrate is a textile.

16. A method according to claim 12, in which the substrate is leather.

17. A method according to claim 12, in which the substrate is chipboard.

18. A method according to claim 12, in which the substrate is calcium carbonate powder.

19. A method according to claim 12, in which the substrate is paper.

20. A method of treating a polyvinylacetate adhesive to render it water repellent when dry comprising the steps of mixing said adhesive with a composition as claimed in claim 1 and drying the mixture.

21. A method of treating an ink to render it water repellent when dry comprising the steps of mixing said ink with a composition as claimed in claim 1 and drying the mixture.

* * * * *